United States Patent Office 3,083,467
Patented Apr. 2, 1963

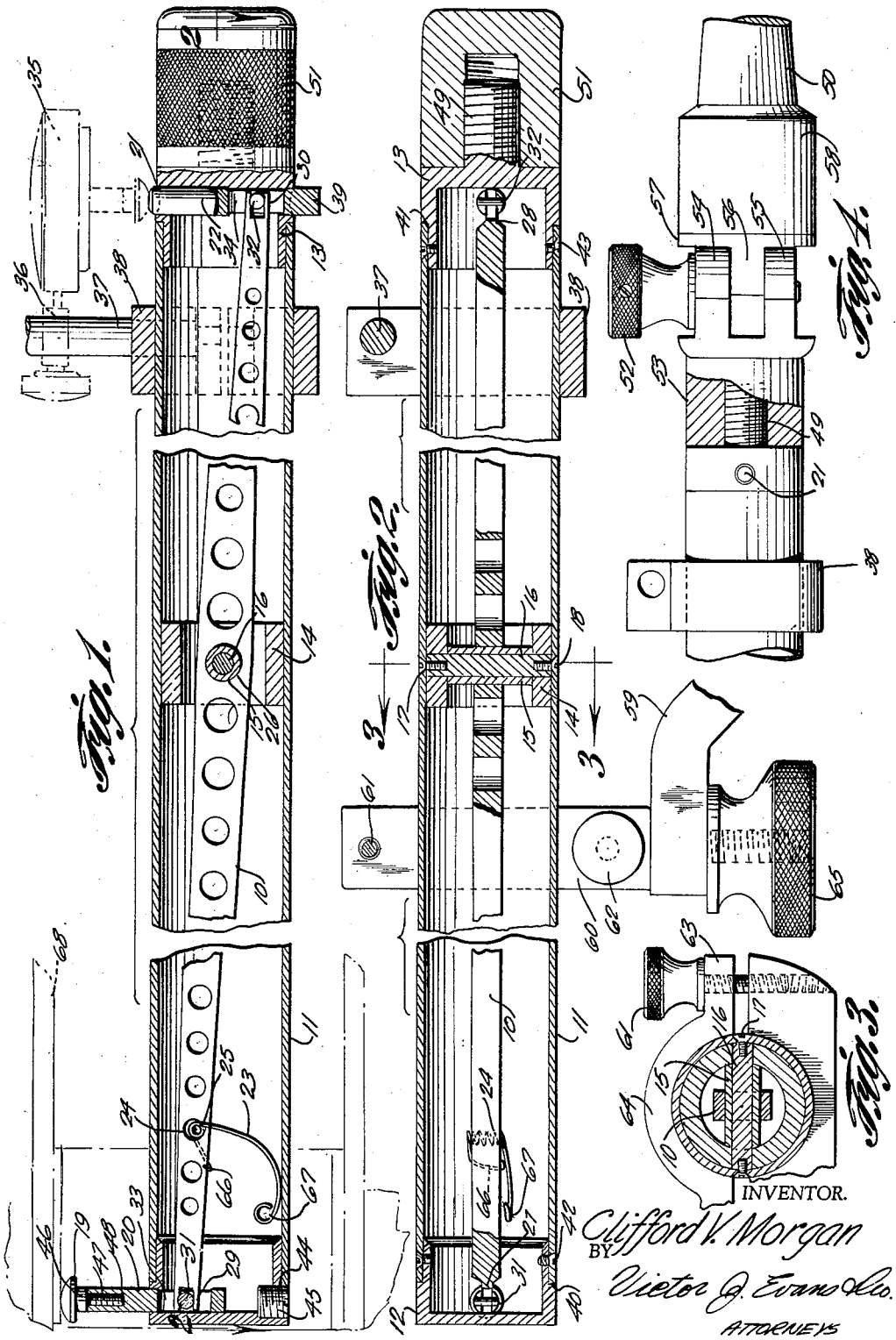

3,083,467
INSIDE INDICATOR BAR
Clifford V. Morgan, 2774 Jonesboro Road SE.,
Atlanta, Ga.
Filed Sept. 22, 1959, Ser. No. 841,576
1 Claim. (Cl. 33—172)

This invention relates to measuring instruments used particularly in combination with machine tools, and in particular a transfer bar pivotally mounted in an elongated tube with buttons at the ends whereby a button extended from the outer end of the bar travels exactly the same distance as a button extended from the inner end of the instrument so that by accurately measuring the travel of the button on the outer end of the bar the travel of the button on the inner end is ascertained.

The purpose of this invention is to provide means for measuring inside of an elongated object to facilitate machining to accurate dimensions.

Various tools have been provided for taking measurements in cylindrical, and other substantially enclosed forms and whereas such instruments are accurate for measuring comparatively close to end tools and the like it is difficult to use such gauges and other indicators inside of relatively long casings and the like. With this though in mind this invention contemplates an elongated instrument having a rocker arm providing a transfer bar therein with the transfer bar pivotally mounted exactly at a point intermediate the ends thereof and with buttons positioned at ends of the transfer bar and extended from sides of the instrument whereby the movement of the button inside of a casing is accurately indicated by the button at the opposite end of the instrument and extended from the wall thereof.

The object of this invention is, therefore, to provide a measuring instrument having buttons carried by transversely disposed spindles slidably mounted in opposite ends of a casing with a transfer bar pivotally mounted at a point intermediate of the length of the casing positioned whereby ends thereof actuate the buttons.

Another object of the invention is to provide an inside indicating instrument in which movements of the parts are accurate and may be indicated by a dial indicator, or the like.

A further object of the invention is to provide an indicator for measuring the amount of paper per inch or foot of an inside bore.

A still further object is to provide an indicator for accurately measuring the amount the inside surface of an object is running out of center.

With these and other objects and advantages in view the invention embodies an elongated tube, heads having openings in sides thereof positioned on the ends of the tube, spindles having buttons on outer ends and slots in the intermediate portions positioned in the openings of the heads, a transfer bar extended through the tube and positioned with ends thereof in the slots of the spindles, a bearing midway between ends of the tube pivotally mounting the transfer bar, a tension spring for urging the transfer bar to a neutral position, and a threaded stud with a cap thereon extended from the head at one end of the tube.

Other features and advantages of the invention will appear from the following description taken in connection with the drawings, wherein:

FIGURE 1 is a longitudinal section through the inside indicator with parts broken away and showing a dial indicator on the outer end thereof.

FIGURE 2 is a sectional plan through the indicator bar taken on line 2—2 of FIGURE 1, also with parts broken away.

FIGURE 3 is a cross-section through the indicator bar taken on line 3—3 of FIGURE 2 showing the device supported in a mounting clamp of a tool post holder.

FIGURE 4 is a side-elevational view, with parts broken away, illustrating an adapter for supporting a tool, such as a Morris taper spindle on the extended end of the indicator bar.

Referring now to the drawings wherein like reference characters denote corresponding parts the inside indicator of this invention includes a transfer bar 10 positioned in a tube 11 having an inside head 12 on one end, an outside head 13 on the opposite end, a fulcrum ring 14 in the intermediate part and positioned midway between the inner and outer heads, a sleeve 15 extended through the transfer bar and by which the transfer bar is pivotally mounted on a pin 16 secured in the ring 14 by screws 17 and 18, a button 19 on a spindle 20 positioned in the inside head 12, a knob 21 positioned on the end of a spindle 22 in the outside head 13, and a tension spring 23 having a coil 24 mounted by a pin 25 on the transfer bar and positioned to urge the inside end of the transfer bar outwardly from the center, as illustrated in FIGURE 1.

The transfer bar 10 is provided with a center opening 26 in which the sleeve 15 is positioned and the ends of the bar are provided with bifurcated flat sections 27 and 28, fingers 29 and 30 of which straddle pins 31 and 32 which extend through slots 33 and 34, respectively, of the spindles 20 and 21.

With the transfer bar 10 pivotally mounted by the pin 16 in the sleeve 15 and with the axis of the pin 16 midway between the axes of the pins 31 and 32 downward movement of the button 19 moves the button 21 upwardly an exact amount. Movement of the knob 21 of the spindle 22 is shown on a dial indicator or other gauge 35 and with the gauge mounted by an eye 36 on a post 37 extended from a band 38 positioned on the tube 11 dimensions will be accurately indicated on the gauge 35. The opposite end of the spindle 22 is also provided with a knob 39 whereby the spindle may be actuated against the spring 23.

The heads 12 and 13 are accurately machined to provide recesses 40 and 41 that receive ends of the tube 11 and the heads are secured in the ends of the tube by screws 42 and 43.

The inside head 12 is provided with a threaded opening 44 that is aligned with the spindle 20 to facilitate assembly of the instrument, and the opening 44 is provided with a plug 45 providing a closure therefor.

The button 19 is provided with a shoulder 46 from which a threaded stud 47 extends and, as shown in FIGURE 1, the button is threaded in an opening 48 in the spindle 20.

The outside head 13 is provided with a threaded stud 49 for mounting tools or other instruments on the outer end of the indicator, such as a Morris taper spindle 50, and the threads of the stud 49 are protected by a cap 51 having a knurled outer surface.

The spindle 50 may be mounted by a thumb screw 52 on an adapter 53, threaded on the stud 49, the adapter having eyes 54 and 55 meshing with a tongue 56 extended from a bushing 57 on which the spindle is mounted by a base portion 58.

The indicator or instrument may be mounted on a tool holder 59 of a lathe or the like with a clamp 60 through which the tube 11 extends. The tube is secured in the clamp by thumb screws 61 and 62 which are positioned in flanges 63 of a cap 64, and the clamp is secured on the tool holder by a knurled or thumb nut 65.

The tension spring 23 is provided with a coil 24 which is positioned on the pin 25 and one end 66 of the spring extends under the transfer bar 10 with the opposite end on which a coil 67 is positioned bearing against the inner surface of the tube 11.

With the parts assembled as illustrated and described work clamped in the chuck of a lathe or mounted on a planer, shaper, drill press or the like and having an elongated opening therein may be machined to accurate dimensions by engaging parts, such as indicated by the broken lines 68 with the button 19 with the tool clamped in a tool holder or other part of the machine tool.

A machinist, mechanic, or other worker may, therefore, by the use of this indicator machine parts in inaccessible places without the necessity of assembling bars, scales, or other measuring devices for use in such openings.

It will be understood that modifications, within the scope of the appended claim, may be made in the design and arrangement of the parts without departing from the spirit of the invention.

What is claimed is:

In an indicating instrument, the combination which comprises an elongated tube, an inside head positioned in one end of the tube, an outside head having a threaded stud extended therefrom mounted in the opposite end of the tube, spindles having slots therein with pins extended through the slots slidably mounted in the heads and positioned transversely of the tube, a transfer bar having bifurcated ends positioned with the ends in the slots of the spindles and straddling the pins of the spindles, a pivotal mounting for the transfer bar being positioned midway between the axes of the pins of the spindles, said pivotal mounting comprising a fulcrum ring mounted in the tube, a pin secured in the ring and extending transversely of said tube and a sleeve to which said transfer bar is secured rotatably mounted on said pin, a button on the end of the spindle of the inside head, a knob on the end of the spindle of the outside head, a tension spring for actuating the transfer bar for urging the button outwardly of the tube, a protecting cap threaded on the threaded stud of the outside head, and mounting means for the tube in a machine tool or the like.

References Cited in the file of this patent
UNITED STATES PATENTS

| | | |
|---|---|---|
| 1,445,482 | Bull | Feb. 13, 1923 |
| 2,016,659 | Tydeman | Oct. 8, 1935 |
| 2,581,256 | Hinkle | Jan. 1, 1952 |